INVENTOR
Hans Wagner

INVENTOR
Hans Wagner
By
Walter Becky

INVENTOR
Hans Wagner

United States Patent Office 3,389,625
Patented June 25, 1968

3,389,625
DEVICE FOR STRAIGHTENING A RECTILINEAR-
LY DISPLACEABLE TOOL RECIPROCATING
MEMBER OF MACHINE TOOLS
Hans Wagner, Dusseldorf, Germany, assignor to Schiess
Aktiengesellschaft, Dusseldorf, Germany
Filed May 23, 1966, Ser. No. 552,269
Claims priority, application Germany, May 28, 1965,
Sch 37,135
5 Claims. (Cl. 82—2)

The present invention relates to a device for straightening a rectilinearly displaceable tool reciprocating member of machine tools. It is known to guide a rectilinearly movable reciprocable member of machine tools by rolling elements which permit an approximately friction-free displacement of the reciprocable member. As a rule, the location of the axis of the reciprocable member or pushrod is for instance with regard to the axis of rotation of a face plate carrying a work piece dependent not alone on the precision of the pushrod receiving member but also on the supporting means and guiding means mounted on the machine tool and intended for receiving the pushrod. Such pushrod receiving member may, for instance, consist of a carriage displaceable on a transverse beam of the machine tool.

In practice it is almost impossible to precisely arrange two guiding means perpendicular to each other in this position, but in practically all instances slight deviations will occur which latter have to be compensated for by special adjustments.

Even then the for instance vertical location of the pushrod axis is not always assured in operation. If it is assumed that the axis of the pushrod receiving member is, for instance, precisely perpendicular to the direction of movement of the carriage, this does not mean that the axis of the pushrod is arranged perpendicular and precisely coincides with the axis of rotation of the face plate or is located parallel to the axis of rotation of the face plate. Instead, a slight deviation is possible due to the fact that the transverse beam which carries the carriage bends or deflects slightly which in turn may result in a corresponding deviation of the axis of the pushrod from the intended direction.

These difficulties fundamentally exist with each guiding arrangement for the pushrod. Therefore, a number of steps have been taken heretofore which permit a realignment of the pushrod within the guiding means therefor.

It is an object of the present invention to provide an improved device for aligning the rectilinearly displaceable tool reciprocating member of machine tools, which tool reciprocating member is guided by roller guiding means supporting the tool reciprocating member on opposite sides in supporting means for said tool reciprocating member.

It is another object of this invention to provide a device as set forth in the preceding paragraph, which will make it possible so to adjust the individual supporting surfaces for the pushrod that the guiding means for the pushrod can be adjusted by a slight angle of inclination.

It is still another object of this invention to provide a device as set forth above, which will assure a precise lateral guiding of the roller elements for the pushrod.

These and other objects and advantages of the invention will appear more clearly from the following specification in connection with the accompanying drawings, in which.

Figure 1:
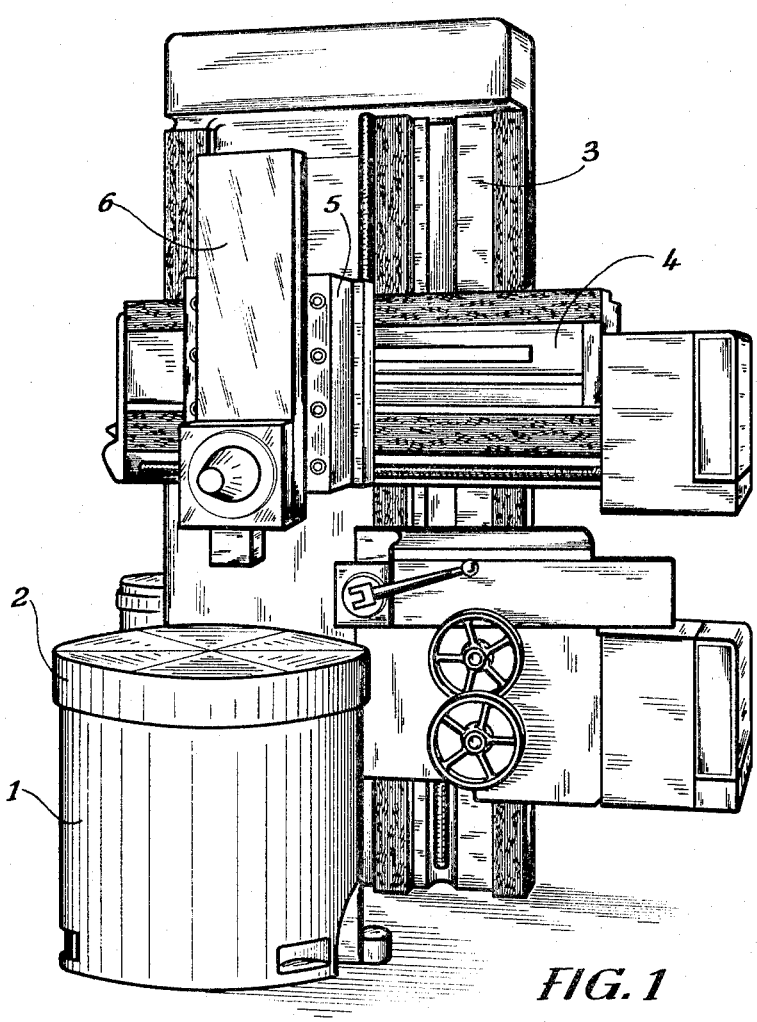
FIG. 1 is an isometric view of a vertical lathe with horizontally displaceable carriage and with vertically displaceable tool reciprocating member or pushrod.
Figure 2:
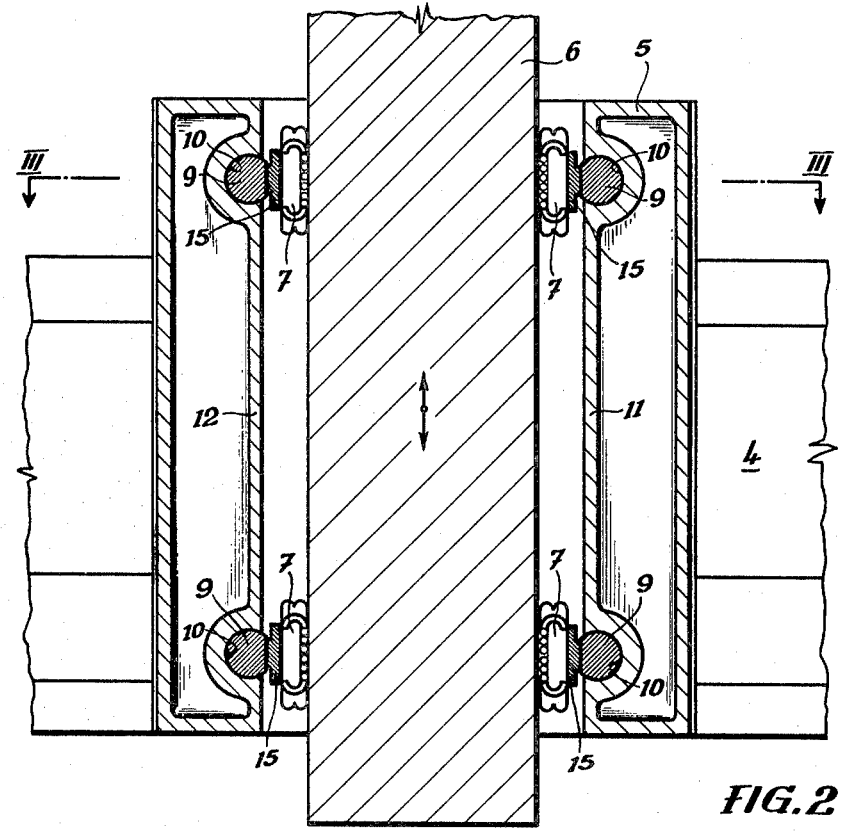
FIG. 2 illustrates on a larger scale than that of FIG. 1 a diagrammatic section through the carriage with the pushrod of FIG. 1, the section of FIG. 2 being taken along the line II—II of FIG. 3.
Figure 3:
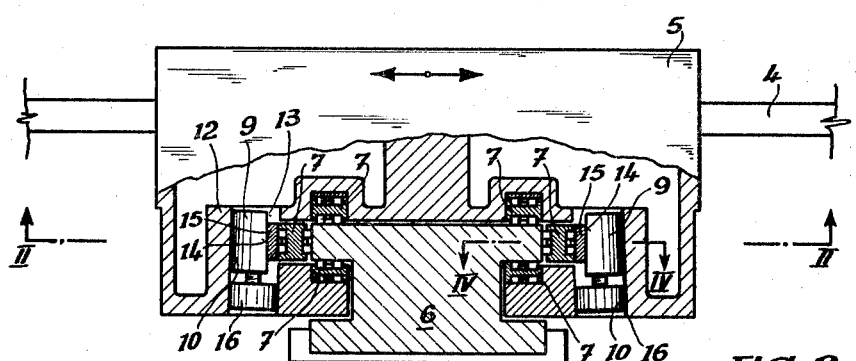
Figure 4:
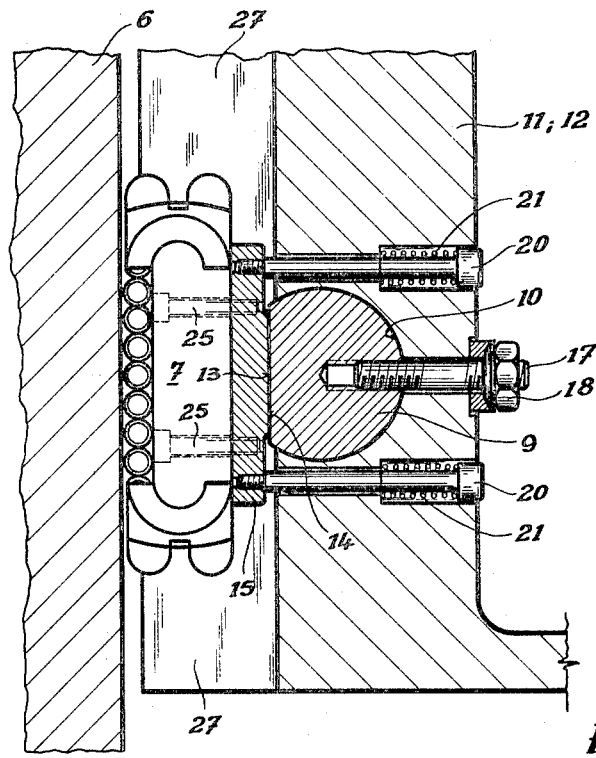
Figure 5:
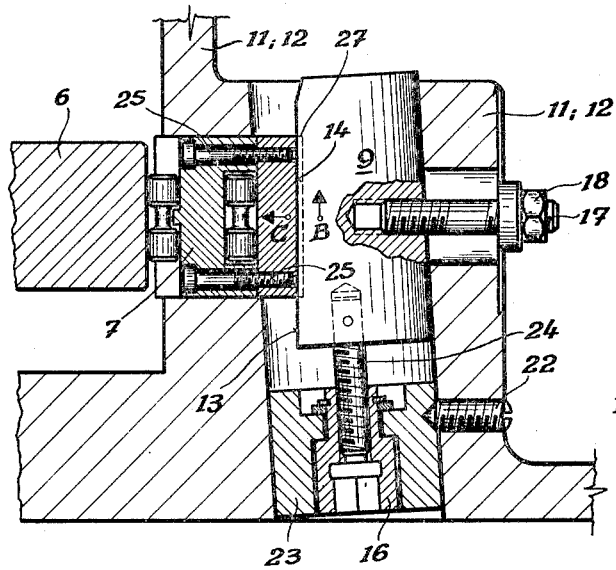
Figure 6:
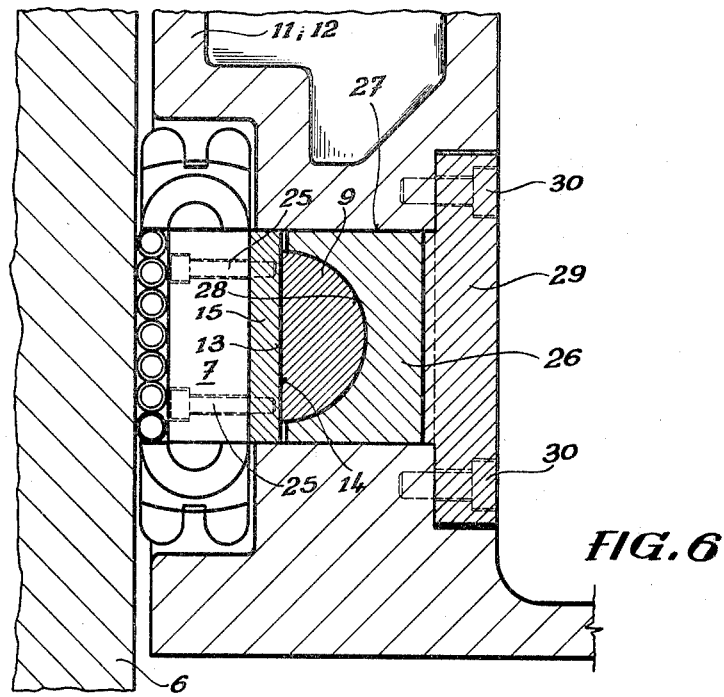
Figure 7:
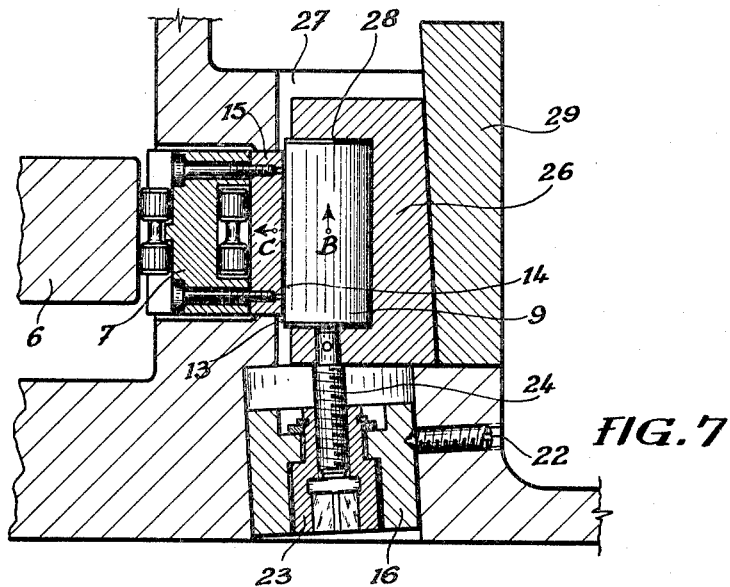

FIG. 3 is a section along the line III—III of FIG. 2.
FIG. 4 is a section along the line IV—IV of FIG. 3.
FIG. 5 represents on an enlarged scale the portion within the dot-dash circle L of FIG. 3.
FIG. 6 is an enlarged section through the pushrod guiding means of a supporting body of a modification of the present invention.
FIG. 7 is a section similar to that of FIG. 5 but concerning the modification of FIG. 6.

The present invention is characterized primarily in that the roller guiding elements for guiding the reciprocable pushrod for the tool are in their turn supported and held by plane supporting surfaces of supporting bodies which are turnable about shafts extending parallel to the guiding planes and transverse to the longitudinal extension of the pushrod, and which are all or with the exception of one additionally adjustably relative to the pushrod. Such an arrangement will assure that the individual supporting surfaces are adjustable relative to each other in such a way that the pushrod guiding means can be adjusted by a slight angle of inclination in order in this way to effect a correction in the location. With this adjustment, the supporting bodies automatically turn in such a way that their supporting surfaces and the supporting surfaces of the roller guiding means snugly rest upon each other and that the roller guiding means will be uniformly loaded throughout their entire length. A pressing of the edges or the like will in this way be prevented and the desired adjustment or alignment of the pushrod will be assured. If desired, the supporting bodies may be formed by cylindrical sections which are tiltably journalled in cylindrical cutouts of the pushrod supporting means in a direction transverse to the longtudinal axis of the pushrod while the plane cross-sectional surface of said supporting bodies forms the guiding surface for the respective roller guiding element.

According to a further development of the present invention, the axis of the cylindrical sections may be inclined with regard to the guiding surface of the pushrod while the cylindrical section is adjustable in the direction of its longitudinal axis, and its cross-sectional surface has an inclination which nullifies the inclination of the axis of the cylindrical section relative to the supporting surface on the pushrod.

Thus, a longitudinal displacement of the cylindrical section in axial direction brings about a displacement of the sectional surface of the cylindrical section toward the pushrod or away from the same and thus a corresponding displacement of the pushrod while at the same time the tilting of the supporting body will further assure a snug engagement of the supporting surfaces on each other in spite of the angular correction of the direction of the pushrod.

According to a further development of the invention, between the respective roller guiding element and the sectional surface of the cylindrical section there may be provided a sliding plate threadedly connected to the roller guiding element, said plate being guided in the direction of the displacement of the pushrod and being located in a groove of the pushrod receiving wall.

The interposition of the sliding plate represents a relief of the rollers facing the pushrod receiving wall and pertaining to the roller guiding elements, because the said plate will not take part in the displacement of the cylindrical section. Furthermore, the groove engaged by the sliding plate assures a precise lateral guiding of the roller guiding elements.

According to another embodiment of the invention, the supporting bodies may rest in wedge-shaped bodies which are displaceable transverse to the longitudinal direction of the pushrod and are held in the wall of the pushrod receiving means. In this instance, the supporting bodies are not displaced alone but together with the wedge-shaped bodies receiving the same so that as a result thereof the movement of the supporting surface toward the pushrod or the movement away therefrom will be effected.

Referring now to the drawings in detail, the lower machine part 1 has journalled thereon a driven face plate 2. The machine furthermore comprises a stand 3 which has vertically displaceably arranged thereon a transverse support 4. A carriage 5 is displaceable horizontally on said transverse support 4 and carries a tool reciprocating member or pushrod 6. Pushrod 6 is adjustable in the guiding means of carriage 5 in such a way that the guiding direction of the pushrod 6 is parallel to the axis of rotation of face plate 2 or, expressed differently, is vertical.

FIGS. 2 to 5 diagrammatically illustrate different sections at different scales through carriage 5 and the receiving means thereof for pushrod 6. More specifically, pushrod 6 is held between oppositely located roller guiding elements 7 by means of which said pushrod is displaceable in the direction of the arrow A in an almost friction-free manner. The elements 7 rest on a supporting body through the intervention of guiding plates 15 screwed onto guiding elements 7. The said roller guiding elements 7 are formed by a cylinder section 9 which is tiltably journalled in partial cylinder sections 10 on the walls 11 and 12 of carriage 5. The axis of the partial cylinder sections 10 is slightly inclined with regard to the guiding surface 14 of the respective sliding plate 15 associated therewith. The inclination of the sectional surface 13 of the cylinder section 9 is so selected with regard to the axis of cylinder section 9 that it compensates for the inclination of the axis of cylinder section 9 with regard to the guiding surface on pushrod 6, which is engaged by the roller guiding elements 7.

Cylinder section 9 is longitudinally displaceable in the cylindrical cutout 10 so that a longitudinal displacement amounts to a displacement of the supporting surface 13 toward pushrod 6 or away from the latter as a result of which a corresponding displacement of pushrod 6 occurs through sliding plate 15 and roller guiding element 7, when at least three of the cylinder sections 9 are axially displaced. One of the adjusting devices may remain stationary so that it will so to speak form the tilting point for the entire system.

The connection of the roller guiding elements 7 with the sliding plate 15 is effected by threaded bolts 25. The guiding surface which cooperates with plate 13 of cylinder section 9 is designated with the reference numeral 14.

As will be seen from FIG. 3, pushrod 6 is at both sides in carriage 5 guided three times by roller guiding elements 7 with guiding plate 15. Those roller guiding elements which engage the lateral surfaces of the carriage rest on supporting bodies 9 which permit an adjustment toward pushrod 6 and a tilting of the roller guiding elements 7. FIG. 3 also indicates that the cylindrical cutouts 10 in walls 11 and 12 of carriage 5 are inclined relative to the guiding surfaces 14 of the guiding plates 15 of the roller guiding elements 7 so that the sectional surface 13 of the cylinder sections 19 has a corresponding inclination by means of which the inclination of the axis of the cylinder sections 19 relative to the guiding surface 14 of guiding plate 15 will be compensated for. In cylindrical cutouts 10, counter stoppers 16 are connected by means of screws 22. Rotatably journalled in said stoppers 16 are nuts 23 into which adjusting screws 24 are respectively screwed which by turning nuts 23 can be screwed out more or less and thus bring about an axial displacement of cylinder section 9.

When a displacement of cylinder section 9 is effected in the direction of the arrow B, simultaneously a displacement of the supporting surface 13 of cylinder section 9 in the direction of the arrow C is effected so that the pushrod 6 will at the same time be displaced in the direction of the arrow C through the intervention of sliding plate 15 and roller guiding element 7. Inasmuch as cylinder section 9 is rotatable about its axis, the supporting surface 13 in combination with the sliding plate 15 and the roller guiding element 7 is adapted automatically to adjust itself about the tilting axis on the guiding surface of pushrod 6.

The above outlined adjustment of the individual roller guiding elements 7 is effected directly and sequentially whereby the desired aligning of the pushrod 6 is effected. After the alignment has been completed, the cylinder section 9 is tightened by means of screws 17 and nuts 18 which through slots 19 in walls 11, 12 engage the cylinder section 9. Slot 19 permits the axial displacement of the cylinder section 9. For purposes of connecting the sliding plate 15 with the cylinder section 9 in such a way that the cylinder section 9 only but not sliding plate 15 will be subjected to a diplacement, spring-biased screws 20 extend through walls 11, 12. Springs 21 biasing screws 20 furthermore assure that the sliding plate 15 and the roller guiding elements 7 are able to follow the titling movements of cylinder section 9. Sliding plate 15 is located in a guiding groove 27 in the pushrod receiving walls 11, 12 whereby also the roller guiding elements 7 are held in walls 11, 12. As will be seen from the drawing, guiding groove 27 extends in a direction parallel to the longitudinal direction of the pushrod.

As will be seen from FIG. 4, screw 17 extends through walls 11, 12 with lateral play in such a way that the tilting movements of cylinder section 9 will be possible to the maximum occuring extent.

The modification illustrated in FIGS. 6 and 7 is similar to that of the preceding figures but differs therefrom in that the adjusting screw 24 does not directly engage the cylinder section 9 but instead engages the wedge-shaped body 26 in a wedge guiding groove 27. The wedge-shaped body 26 has a semi-cylindrical trough 28 receiving the cylinder section 9 so that cylinder section 9 similar to the preceding embodiment is tiltable about its longitudinal axis. A displacement of the wedge-shaped body 26 and thus of the cylinder section 9 in the direction of the arrow B brings about a displacement of the sliding plate 15 and thus of the guiding element 7 in the direction of the arrow C so that the pushrod 6 will be subjected to a corresponding correction of its location with regard to receiving the pushrod.

The angular correction is thus effected in the same way as described in connection with the preceding embodiment of the invention. The guiding groove 27 having the wedge-shaped body 26 arranged therein is accessible from the outside and is closed toward the outside by a plate 29 which is connected to the walls 11, 12 of the pushrod receiving means by screws 30. In this instance holding means for the cylinder section 9 by means of a screw 17 as described in connection with FIGS. 4 and 5 is superfluous because the cylinder section 9 in trough 27 of wedge-shaped body 26 is firmly located in all directions while a tilting about its axis is still permitted.

It is, of course, to be understood that the present invention is, by no means, limited to the particular arrangements and devices shown in the drawings but also comprises any modifications within the scope of the appended claims.

What is claimed is:

1. In combination; a first member reciprocable in a first direction; a second member in the form of a tool support supported by said first member for reciprocation thereon in a second direction at an angle to said first direction, and guiding means interposed between said members for guiding said second member on said first member while providing for adjustment of the path taken by said second member, said guiding means comprising at least two roller guiding elements on each of two opposite sides of said second member, said roller guiding elements being arranged in opposed pairs along said second member with the pairs spaced in the direction of movement of said second member, a tiltable support body on said first member for each said roller guiding element and tiltable about a tilt axis generally parallel to the guide path established by the pertaining roller guiding element and transverse to said first direction, and means for adjusting the said support bodies of said pairs of roller guiding elements relatively in a direction toward away from said second member.

2. The combination according to claim 1 in which each support body is in the form of a cylindrical section disposed in a cylindrical recess in said first member with the axis of each section coinciding with its tilt axis, and each said section having a planar surface on the side toward said second member forming the support for the respective said roller guiding element.

3. The combination according to claim 2 in which said tilt axis for each said cylindrical section is inclined relative to the guiding plane established by the respective roller guiding element, and means for adjusting both of the said cylindrical sections of one pair thereof and at least one section of the other pair thereof in the direction of their length to adjust said bodies relative to each in a direction toward and away from said second member.

4. The combination according to claim 3, which includes a plate connected to each roller guiding element and disposed between the respective roller guiding element and its supporting body, said first member being slotted to receive said plates.

5. The combination acording to claim 2 in which each said cylindrical section has its axis parallel to the guiding plane established by the respective said roller guiding element, a wedge block in said first member for each cylindrical section and having a cylindrical recess for receiving the respective section, each wedge block having a wall surface engaging said first member which is inclined relative to the guiding path established by the respective roller guiding element, and means for adjusting at least both of the wedge blocks of one of said pairs of roller guiding elements and one wedge block of the other pair thereof on said one member to adjust the pertaining sections toward and away from said second member.

References Cited

UNITED STATES PATENTS 2,897,706  8/1959  Berthiez _____ 82—2
2,914,362  11/1959  Ott et al. _____ 308—3

LEONIDAS VLACHOS, *Primary Examiner.*